United States Patent [19]

Saito

[11] Patent Number: 4,918,546
[45] Date of Patent: Apr. 17, 1990

[54] TRACKING CONTROL DEVICES FOR VIDEO TAPE RECORDERS

[75] Inventor: Isao Saito, Kawasaki, Japan

[73] Assignee: Sony Corporation, Tokyo, Japan

[21] Appl. No.: 767,659

[22] Filed: Aug. 21, 1985

Related U.S. Application Data

[63] Continuation of Ser. No. 386,041, Jun. 7, 1982, abandoned.

[30] Foreign Application Priority Data

Jun. 9, 1981 [JP] Japan .................................. 56-88364

[51] Int. Cl.$^4$ .............................................. G11B 5/52
[52] U.S. Cl. .................................... 360/77.13; 360/75
[58] Field of Search ............................. 360/75, 77, 70

[56] References Cited

U.S. PATENT DOCUMENTS

| | | | |
|---|---|---|---|
| 3,596,064 | 7/1971 | Markevitch | 369/44 |
| 3,624,284 | 11/1971 | Russell | 369/44 |
| 3,876,888 | 4/1975 | Gyugyi et al. | 328/14 X |
| 3,985,952 | 10/1976 | Adler | 369/44 |
| 4,063,387 | 12/1977 | van Rosmalen | 369/44 |
| 4,067,044 | 1/1978 | Maeda et al. | 369/32 |
| 4,118,735 | 10/1978 | Wilkinson | 369/44 |
| 4,183,067 | 1/1980 | Kihara et al. | 360/75 |
| 4,223,358 | 9/1980 | Kubota et al. | 360/77 X |
| 4,229,773 | 10/1980 | Sakamoto | 360/77 X |
| 4,251,838 | 2/1981 | Saito | 360/77 |
| 4,255,771 | 3/1981 | Kubota | 360/77 |
| 4,267,514 | 5/1981 | Kimsey | 328/133 |
| 4,268,876 | 5/1981 | Sakamo et al. | 360/78 |
| 4,285,017 | 8/1981 | Arter et al. | 360/77 |
| 4,370,685 | 1/1983 | Hasoi et al. | 360/77 |
| 4,392,219 | 7/1983 | Yokozawa et al. | 369/111 X |
| 4,410,918 | 10/1983 | Watanabe | 360/77 |

FOREIGN PATENT DOCUMENTS 1580008 11/1980 United Kingdom .

OTHER PUBLICATIONS

"Designers Guide to: Digital Synchronization Circuits-Part II", Waggener, EDN, vol. 21, No. 15, pp. 75-82, 20, Aug. 76.

Primary Examiner—Aristotelis M. Psitos
Attorney, Agent, or Firm—Lewis H. Eslinger; Jay H. Maioli

[57] ABSTRACT

A tracking control device for a video tape recorder comprises a bimorph leaf on which a rotary playback head is mounted so as to be deflectable in a direction perpendicular to tracks to be scanned. A triangular wave signal generating circuit comprising cascaded flip-flops generates a substantially triangular wave signal which is supplied to the bimorph leaf to cause the playback head to wobble relative to the tracks. A detecting circuit detects an envelope signal in the signal reproduced by the playback head, and a phase comparing circuit which includes an exclusive-OR circuit compares the phase of this envelope signal with the phase of the triangular wave signal. The output of the phase comparing circuit is fed back to the bimorph leaf to effect tracking correction.

10 Claims, 5 Drawing Sheets

TRACKING CONTROL DEVICES FOR VIDEO TAPE RECORDERS

This is a continuation of application Ser. No. 386 041, filed June 7, 1982 and now abandoned.

BACKGROUND OF THE INVENTION

1. Field of the Invention

This invention relates to tracking control devices for video tape recorders (VTRs).

2. Description of the Prior Art

A so-called wobbling type tracking adjuster has been previously proposed for a helical scan type VTR. In this tracking adjuster, a playback head is mounted on a bimorph leaf which can be deflected in dependence on a voltage applied to electrodes of the bimorph. By application of a suitable voltage signal to the bimorph, the playback head is vibrated with a very small amplitude. Because the level of the reproduced signal derived from the playback head is reduced whenever the playback head deviates to either side from the center of the recorded track, the direction of the deviation can be discriminated from the change of level. The error-correcting voltage signal to be applied to the bimorph can thus be derived, and application of this signal to the bimorph enables the playback head to be controlled accurately to trace the recorded track.

This previously proposed tracking adjuster will now be described in more detail with reference to FIG. 1 of the accompanying drawings, which shows the tracking adjuster in block form.

A magnetic tape 1 has had a signal recorded thereon by the so-called helical scan system; that is, the recorded tracks are formed to be skewed relative to the longitudinal direction of the magnetic tape 1. A rotary playback magnetic head 2 scans the recorded, skew tracks to reproduce the signal therefrom.

A sine wave signal generator 3 generates a sine wave signal which forms a head wobbling or dither signal which is supplied to a bimorph 5 through an adder 4. The magnetic head 2 is mounted on the bimorph 5, so the magnetic head 2 is caused to reciprocate in the direction perpendicular to the length of the recorded tracks in response to this sine wave signal. Consequently, the level of the reproduced frequency modulated (FM) signal from the magnetic head 2 is changed in dependence on the sine wave signal. The reproduced FM signal is supplied to a synchronous detector circuit 8 through an envelope detector circuit 6 and a low-pass filter 7. The envelope of the reproduced FM signal supplied to the synchronous detector circuit 8 is a signal modulated by deviation of the tracking between the magnetic head 2 and the recorded track.

The sine wave signal is also supplied to the synchronous detector circuit 8 through a delay circuit 9. The delayed sine wave signal is added to the envelope signal at the synchronous detector circuit 8. As a result, the synchronous detector circuit 8 produces a signal changing in accordance with the deviation between the magnetic head 2 and the recorded tracks, and supplies it to the bimorph 5 through a low-pass filter 10 and the adder 4.

In this way, when the scan of the magnetic head 2 deviates from a recorded track, a signal changing in response to that deviation is applied to the bimorph 5 so that the magnetic head 2 correctly scans the recorded track.

Thus, in this previously proposed tracking adjuster, the use of the synchronous detector circuit 8 enables the relation between the amount of tracking error or deviation in the scan and the detected output to be made linear enough to correct for the tracking error or deviation. However, the synchronous detector circuit 8 is complicated, and indeed the whole arrangement of the tracking adjuster is rather complicated. In one particular example thereof, the synchronous detector circuit 8 and the low-pass filter 10 together require four integrated circuits and fifty-seven passive components.

SUMMARY OF THE INVENTION

One object of the present invention is to provide a tracking adjuster making use of simpler circuitry.

Another object of the present invention is to provide a tracking adjuster in which the wobbling signal used is a triangular wave signal.

Another object of the present invention is to provide a tracking adjuster in which a linear relationship is established between the deviation of a playback head from the center of a recorded track and a correcting signal.

According to the present invention there is provided a tracking control device for a video tape recorder, the control device comprising a deflection means for deflecting a rotary playback head in a direction perpendicular to recorded tracks to be scanned in response to a signal applied to said deflection means, a triangular wave signal generating circuit for generating a substantially triangular wave signal, means for supplying said triangular wave signal to said deflection means, a detecting circuit for detecting an envelope signal in a signal reproduced by said playback head, a phase comparing circuit for comparing the phase of said envelope signal and the phase of said triangular wave signal or an equivalent signal to said triangular wave signal, said phase comparing circuit including an exclusive-OR circuit, and means for supplying said compared output from said phase comparing circuit to said deflection means to correct tracking error of said playback head relative to said tracks.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 7 to 9G are waveform diagrams for explaining the embodiment of FIG. 2.

DESCRIPTION OF THE PREFERRED EMBODIMENTS

Figure 1:
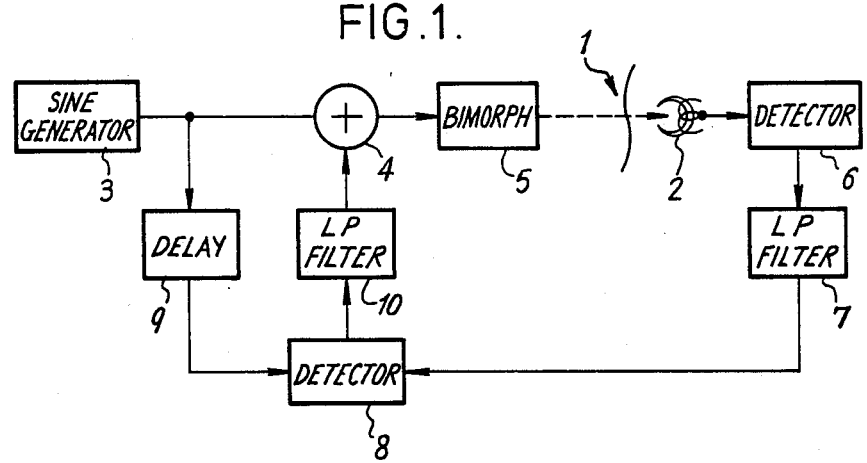
FIG. 1 is a block diagram of a previously proposed tracking adjuster.
Figure 2:
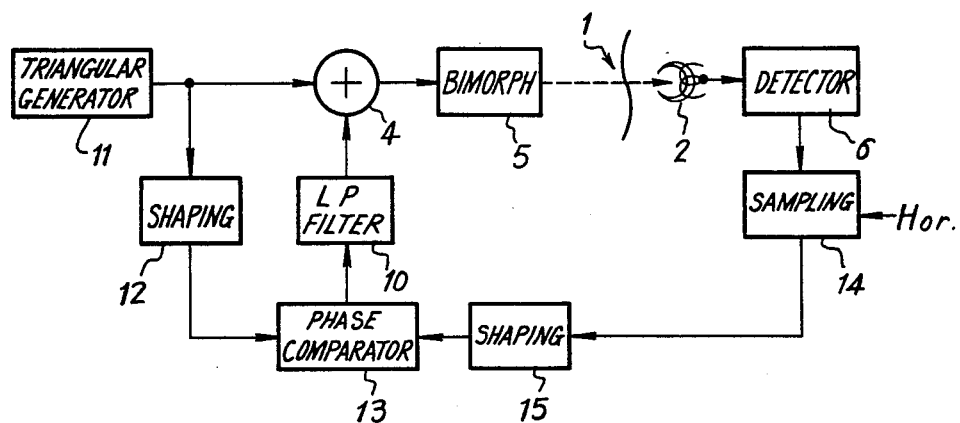
FIG. 2 is a block diagram of an embodiment of tracking adjuster according to the invention.

The embodiment of tracking adjuster according to the invention will now be described with reference to FIGS. 2 to 7. In FIG. 2, parts corresponding to like parts in FIG. 1 are identified by the same reference numerals and will not be further described in detail.

Referring first to FIG. 2, a triangular wave signal generator 11 supplies a triangular wave signal, which in this case forms the wobbling or dither signal, to the bimorph 5 through the adder 4. This triangular wave signal is also supplied through a waveform shaping circuit 12 to a phase comparator 13. The envelope signal from the envelope detector circuit 6 is supplied to the phase comparator 13 through a sampling circuit 14 and a waveform shaping circuit 15. The sampling circuit 14 serves to sample the envelope signal in response to, for example, the horizontal synchronizing signal of the reproduced video signal, thus enabling the noise superimposed on the envelope signal to be removed. A triangular wave signal generated from a strain gauge provided on the bimorph 5 may be supplied to the waveform shaping circuit 12 as shown in our UK patent no 1 580 008.

Figure 3:
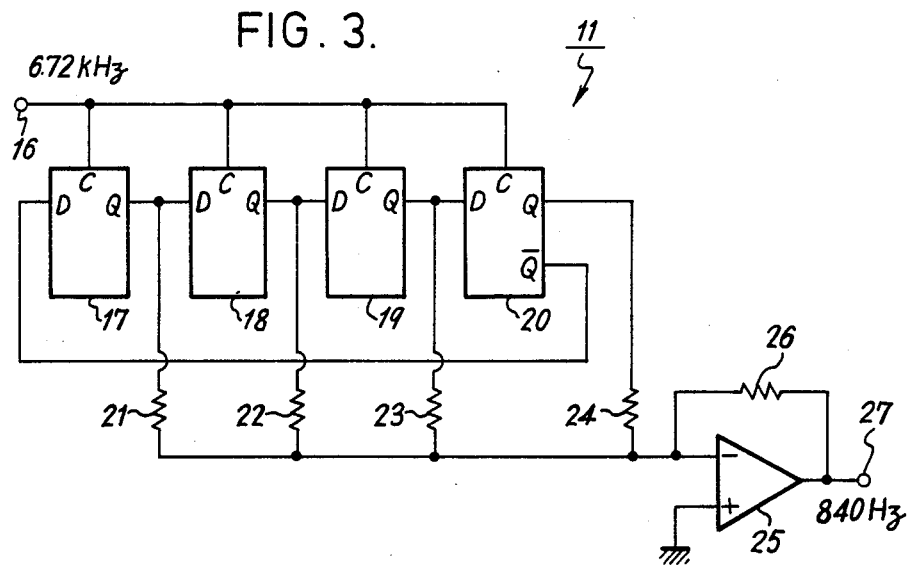
FIG. 3 shows an example of a triangular wave signal generator in the embodiment of FIG. 2.
Figure 4:
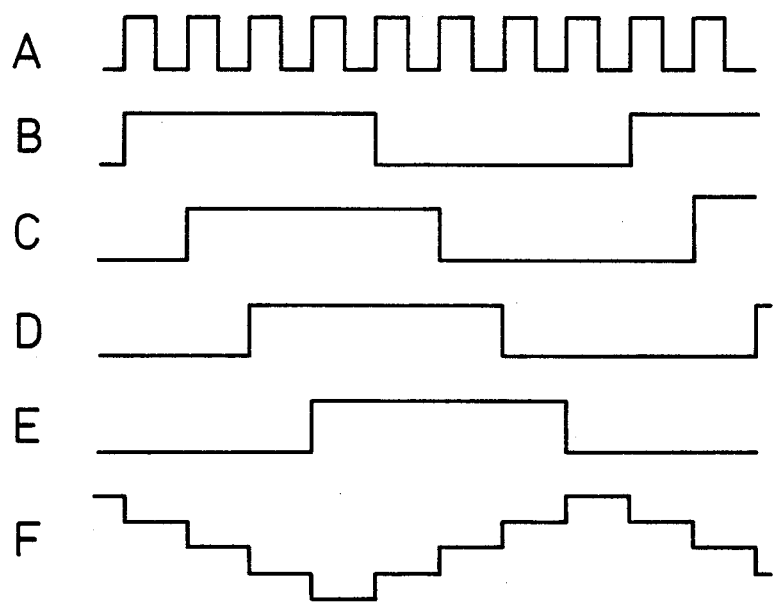
FIG. 4, consisting of A-F, is a waveform diagram for explaining the triangular wave signal generator of FIG. 3.

In this embodiment, the triangular wave signal generator 11 is constructed as shown in FIG. 3. It comprises a pulse signal input terminal 16, through which a pulse signal of, for example, 6.72 kHz is supplied from a pulse generator (not shown) to the clock terminals C of D-flip-flops 17 to 20. The D-flip-flops 17 to 20 are connected in cascade in that order, and the inverted output terminal $\overline{Q}$ of the final D-flip-flop 20 is connected to the input terminal D of the first D-flip-flop 17. The output terminals Q of the D-flip-flops 17 to 20 are respectively connected through resistors 21 to 24 to the inverting input terminal of an operational amplifier 25, which forms an adder, and has a feedback resistor 26. The non-inverting input terminal of the operational amplifier 25 is grounded. The output terminal 27 of the triangular wave generator 11 is connected to the output terminal of the operational amplifier 25.

In the triangular wave generator 11, when a pulse signal (6.72 kHz) as shown in FIG. 4A is supplied to the pulse signal input terminal 16, the D-flip-flops 17 to 20 produce at their terminals Q signals as shown in FIGS. 4B to 4E, respectively. Then, at the output terminal 27 there is produced, as shown in FIG. 4F, a signal resulting from the addition of the waveforms shown in FIGS. 4B to 4E. This signal is in effect a triangular wave signal of 840 Hz (6.72 kHz divided by 8).

Figure 5:
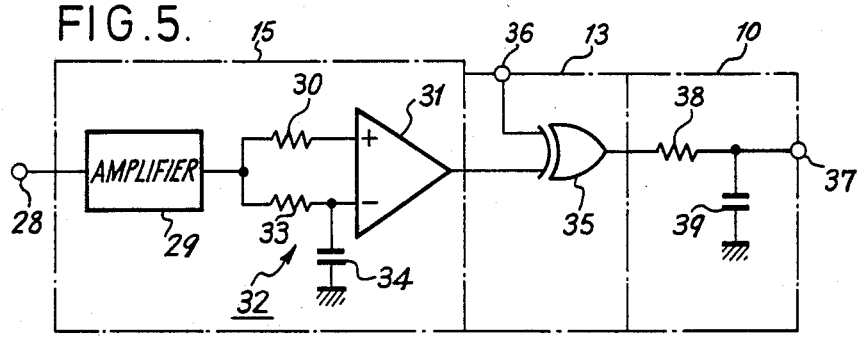
FIG. 5 shows an example of a low-pass filter, a phase comparator and a waveform shaping circuit in the embodiment of FIG. 2.
Figure 6:
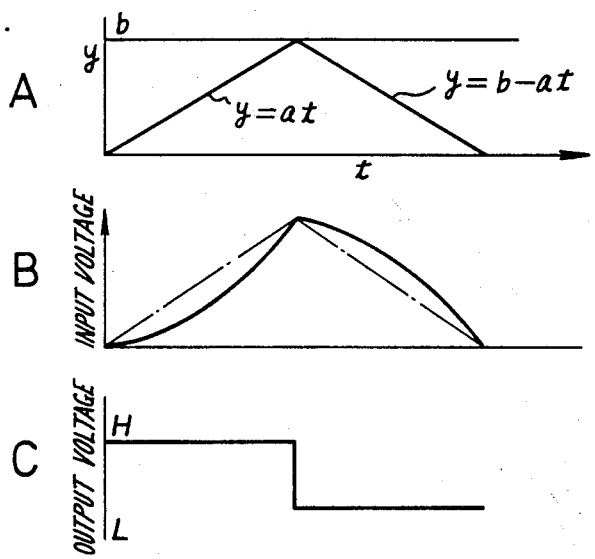
FIG. 6, consisting of A-C, is a waveform diagram for explaining the circuitry of FIG. 5.

In this embodiment, the waveform shaping circuit 15, the phase comparator 13 and the low-pass filter 10 are constructed as shown in FIG. 5. An envelope signal is supplied by way of an input terminal 28 to an amplifier 29. The amplified envelope signal from the amplifier 29 is supplied through a resistor 30 to the non-inverting input terminal of an operational amplifier 31 and also through an integrating circuit 32 to the inverting input terminal of the operational amplifier 31. The integrating circuit 32 is formed of a series circuit of a resistor 33 and a capacitor 34.

In this arrangement, when a ramp signal:

$$y=at$$

as, for example, shown in FIG. 6A is supplied to the envelope signal input terminal 28, signals as shown in FIG. 6B by the solid line and one-dot chain line are supplied to the inverting and non-inverting terminals of the operational amplifier 31, respectively, which thus produces an output "H" (high level) as shown in FIG. 6C. On the other hand, when a signal:

$$y=b-at$$

as shown in FIG. 6A is supplied to the envelope signal input terminal 28, the operational amplifier 31 produces an output "L" (low level) as shown in FIG. 6C.

In the circuitry of FIG. 5, the output of the operational amplifier 31 of the waveform shaping circuit 15 is supplied to the first input terminal of an exclusive-OR circuit 35, while a signal into which the signal from the triangular wave signal generator 11 is waveform-shaped by the waveform shaping circuit 12 shown in FIG. 2 is supplied through a terminal 36 to the second input terminal of the exclusive-OR circuit 35. The waveform shaping circuit 12 is the same as the waveform shaping circuit 15, but the outputs of the waveform shaping circuits 12 and 15 are opposed in phase, that is differ by 180° C., from each other. The exclusive-OR circuit 35 serves to compare the phases of pulse signals.

The phase compared output from the exclusive-OR circuit 35 is supplied through the low-pass filter 10 to an output terminal 37, and the output at the terminal 37 is supplied through the adder 4 to the bimorph 5. The low-pass filter 10 is formed by a series circuit of a resistor 38 and a capacitor 39.

Figure 7:
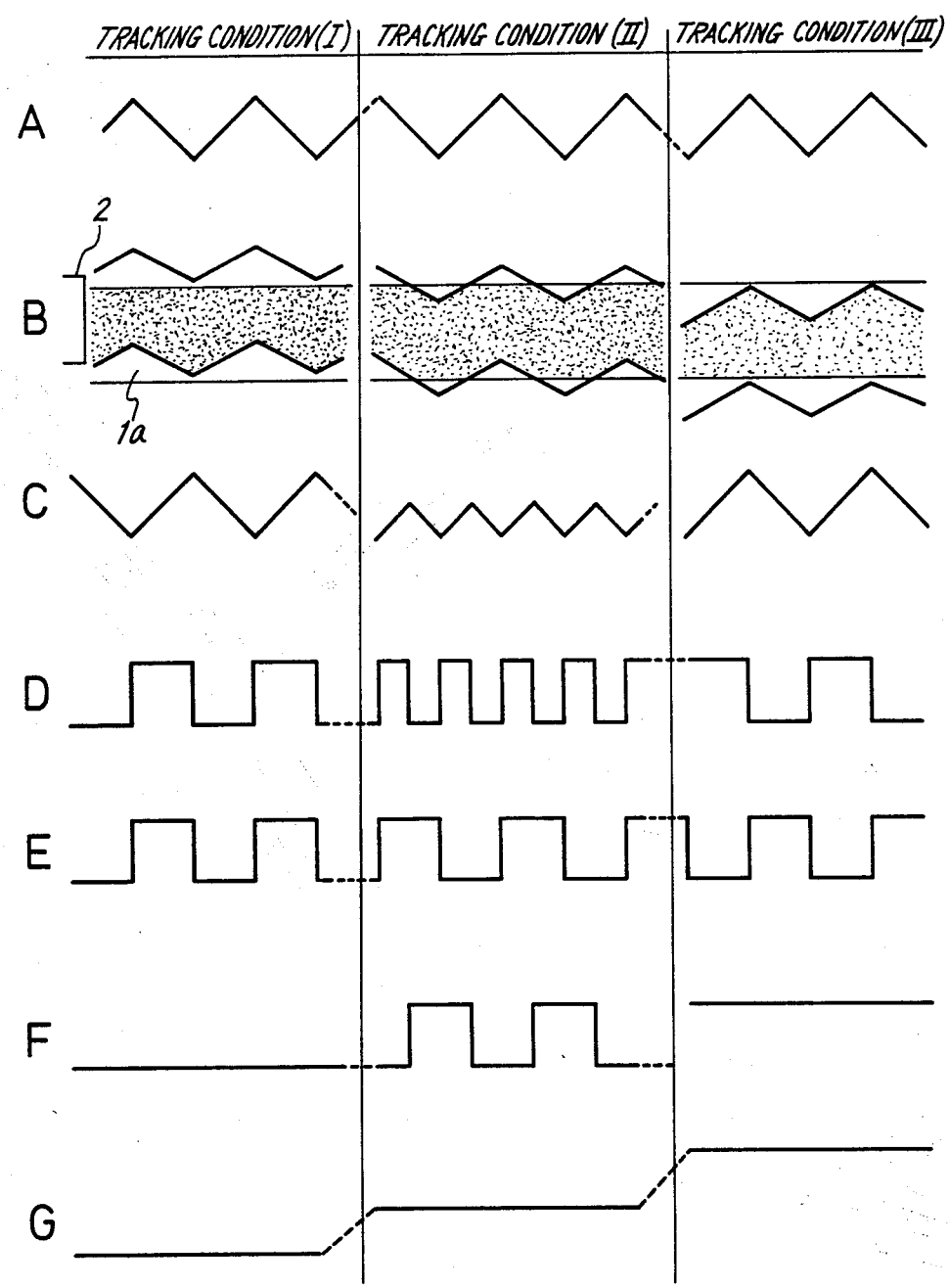

With this arrangement, when the triangular wave signal generator 11 produces a triangular wave signal of, for example, 840 Hz as shown in FIG. 7A, the magnetic head 2 scans a recorded track 1a in a zig-zag pattern as shown in FIG. 7B. When the tracking condition is as shown in FIG. 7 by (I), that is when the magnetic head 2 deviates upwards from correct scanning of a recorded track 1a as illustrated, the envelope detector circuit 6 produces as an envelope signal a triangular wave signal (FIG. 7C) shifted by 180° from the triangular wave signal shown in FIG. 7A. This envelope signal is waveform-shaped by the waveform shaping circuit 15 into a pulse signal of frequency 840 Hz and duty ratio 50% (FIG. 7D).

On the other hand, the triangular wave signal shown in FIG. 7A is waveform-shaped by the waveform shaping circuit 12 into a pulse of frequency 840 Hz and duty ratio 50% (FIG. 7E). This wave-shaped triangular wave is the same as the above-mentioned wave-shaped envelope signal. As a result, the exclusive-OR circuit 35 produces an output of "L" (FIG. 7F) and thus the adder 4 is supplied with a correcting output (FIG. 7G) which is such as to bias the magnetic head 2 downwards in FIG. 7B, so correcting the tracking.

When the tracking condition is as shown in FIG. 7 by (II), that is, the tracking is correct, the envelope signal (FIG. 7C) has twice the frequency of the triangular wave signal shown in FIG. 7A, and the waveform-shaped signal from the waveform shaping circuit 15 is a pulse signal having a frequency of 2×840 Hz and a duty ratio of 50% (FIG. 7D). As a consequence, the exclusive-OR circuit 35 produces a pulse signal of frequency 840 Hz and duty ratio 50% (FIG. 7F), and the low-pass filter 10 produces an output of intermediate level between "L" and "H" (FIG. 7G). In this case, the adder 4 is not supplied with the correcting output, and thus the correct tracking condition conntinues.

When the tracking condition is as shown in FIG. 7 by (III), that is when the magnetic head 2 deviates downwards from correct scanning of a recorded track 1a as illustrated, the envelope signal (FIG. 7C) is a triangular wave signal in phase with that shown in FIG. 7A. The waveform-shaped signal from the waveform shaping circuit 15 is a pulse signal having a frequency of 840 Hz and a duty ratio of 50% (FIG. 7D). The phase is shifted by 180° from that of the waveform-shaped pulse signal shown in FIG. 7E. Consequently, the exclusive-OR circuit 35 produces an output of "H" (FIG. 7F), and thus the adder 4 is supplied with a correcting output (FIG. 7G) for biasing the magnetic head 2 upwards in FIG. 7B, so correcting the tracking.

Figure 8:
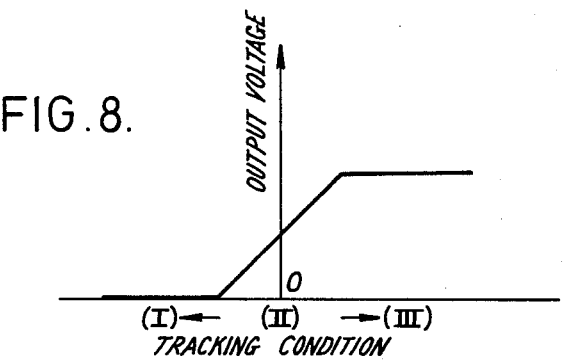

In this embodiment, the tracking deviation between the recorded tracks 1a and the magnetic head 2 and the correcting output to be supplied through the low-pass filter 10 to the adder 4 have a linear relationship as shown in FIG. 8, thus reliably effecting correction of the tracking condition. In other words, as shown in FIG. 9, the duty ratio of the pulse output (FIG. 9F) from the exclusive OR circuit 35 corresponds to the length l in FIG. 9B.

Figure 9:
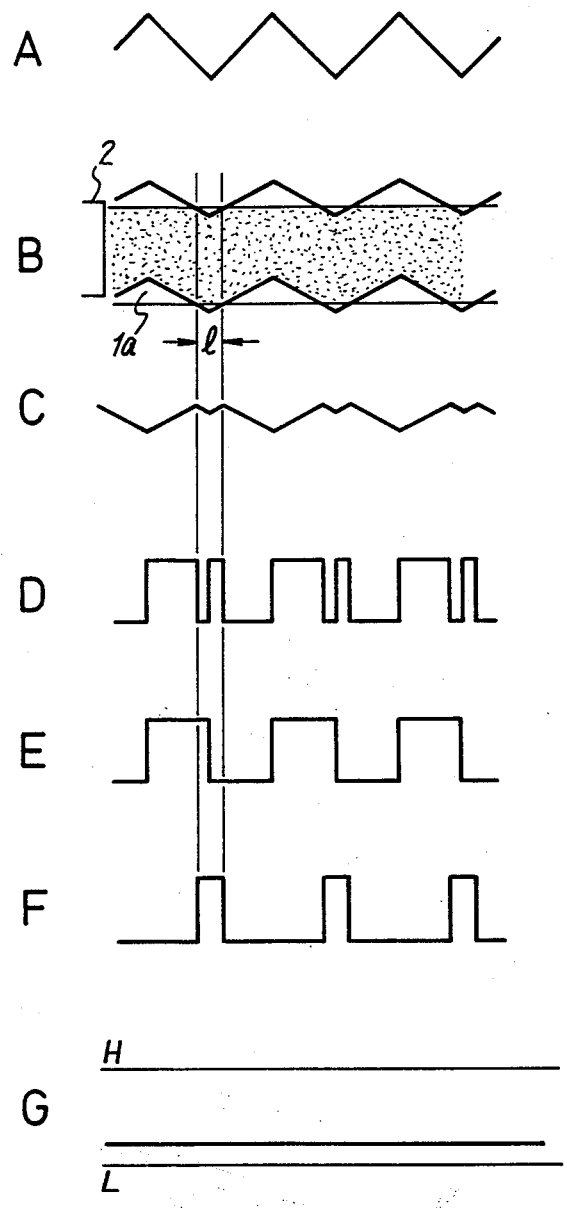

Referring in more detail to FIG. 9, when the tracking condition is as shown in FIG. 9B, that is when the magnetic head 2 deviates upwards a little from correct scanning of a recorded track 1a as illustrated, the envelope signal produced by the envelope detector circuit 6 is a triangular wave signal (FIG. 9C) shifted by 180° from the triangular wave signal (FIG. 9A) produced by the triangular wave signal generator 11, and having notched peaks corresponding to the length l. This envelope signal is waveform-shaped by the waveform shaping circuit 15 into a pulse signal as shown in FIG. 9D, whereas the triangular wave signal shown in FIG. 9A is waveform-shaped by the waveform shaping circuit 12 into a pulse signal as shown in FIG. 9E. The exclusive-OR circuit 35 then produces a pulse signal as shown in FIG. 9F, the durations of the pulses corresponding to the durations of the intervals during which the pulse signals of FIGS. 9D and 9E are out of phase, that is, corresponding to the distance l. Hence the output (FIG. 9G) is not only such as to bias the magnetic head 2 downwards in FIG. 9B but is of a level corresponding to the distance l. In other words, the use of a triangular wave wobbling signal results in a linear relationship between the tracking deviation, the distance l and the correcting signal supplied to the bimorph 5.

Thus, as described above, a triangular wave signal is used as a wobbling signal and compared in phase with a triangular wave signal used as an envelope signal, the compared output being supplied as a correcting output to the bimorph 5. The triangular wave signals are formed into pulse signals by the waveform shaping circuits 12 and 15, and the phase comparison between the resulting pulse signals can easily be done by the exclusive-OR circuit 35.

Also, in this embodiment, since the triangular wave signal generator 11 is formed by the D-flip-flops 17 to 20 and the operational amplifier 25, it can be constructed very simply by using integrated circuits.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A tracking control device for controlling tracking in a video tape recorder that reproduces a signal recorded in a plurality of slanted tracks on a magnetic tape, the control device comprising:

deflection mans for deflecting a rotary playback head in a direction perpendicular to said recorded tracks to be scanned in response to a signal applied to said deflection means, a triangular wave signal generating circuit for generating, independently of the signal reproduced by said playback head, a substantially triangular wave signal fed, as a wobbling signal, to said deflection means for causing said head to scan each of said plurality of slant tracks in a corresponding triangular pattern, means receiving said triangular wave signal for producing a first pulsed signal representing the frequency and phase thereof, detecting circuit means for producing an envelope signal based on a signal reproduced by said playback head including sampling means for sampling said signal reproduced by said playback head at a predetermined rate and producing said envelope signal therefrom, means receiving said envelope signal for producing a second pulsed signal having a phase and frequency indicative of an extent to which said playback head being wobbled by said triangular wave signal does not accurately trace a track being scanned thereby, a phase comparing circuit including an exclusive-OR gate for comparing the phase of said second pulsed signal representing said envelope signal and said first pulsed signal representing the frequency and phase of said triangular wave signal and producing a phase comparison signal therefrom being fed with said triangular wave wobbling signal to said deflection means, said deflection means being responsive to said phase comparison signal and said triangular wave wobbling signal to cause said playback head to accurately trace in a triangular pattern said recorded tracks being scanned.

2. A tracking control device according to claim 1 wherein said triangular wave signal generating circuit comprises a plurality of flip-flop circuits connected in cascade.

3. A tracking control device according to claim 2 wherein each said flip-flop circuit is a D-flip-flop having clock, input and output terminals, and said triangular wave signal generating circuit further comprises a pulse generator for supplying an input pulse signal to the clock terminal of each of said D-flip-flops, an operational amplifier having inverting and non-inverting input terminals, the non-inverting input terminal being grounded, and an output terminal, said output terminals of said D-flip-flops being connected by way of respective resistors to the inverting input terminal of said operational amplifier, the output terminal of said operational amplifier being connected by way of a further resistor to the inverting input terminal of said operational amplifier, and the final one of said D-flip-flops further having an inverting output terminal which is connected to said input terminal of the first said D-flip-flop, said triangular wave signal being derived in use from the output terminal of said operational amplifier.

4. A tracking control device according to claim 1; wherein said sampling means samples is connected to receive a horizontal synchronizing signal derived from said signal reproduced by said playback head for sampling in response thereto.

5. A tracking control device according to claim 1 further comprising low-pass filter means through which is passed said phase comparision signal from said phase comparing circuit, the output of said low-pass filter means being supplied to an adder, to which is also supplied said triangular wave signal for producing a summed signal fed to said deflection means.

6. A tracking control device according to claim 1 wherein said deflection means is a bimorph leaf.

7. A tracking control device according to claim 1; wherein said exclusive-OR gate produces a third pulsed signal having pulse widths corresponding to the durations of intervals during which said first and second pulsed signals are out of phase.

8. Apparatus for controlling tracking during playback in a video tape recorder of the kind having a transducer for deflecting a rotary playback head in a direction perpendicular to recorded tracks to be scanned in response to a signal fed to said transducer, comprising:
  means for producing, independently of signals in the recorded tracks, a triangular waveform head position signal fed, as a wobbling signal, to said transducer for causing said head in response thereto to scan each of said recorded tracks in a corresponding triangular pattern;
  means receiving said triangular waveform signal for producing a first pulsed signal representing the frequency and phase thereof;
  means for detecting the envelope of an output signal produced by said head during playback and producing an envelope signal based on the detected envelope;
  sampling means for sampling said envelope signal at a video synchronization rate based on said output signal;
  means receiving said sampled envelope signal for producing a second pulsed signal representing the frequency and phase thereof;
  comparison means including an exclusive-OR gate connected to receive said second pulsed signal representing the frequency and phase of said envelope signal and said first pulsed signal representing the frequency and phase of said triangular waveform head position signal in which said exclusive-OR gate produces a third pulsed signal having a pulse width representing durations of intervals in which said first and second pulsed signals are out of phase and for producing a direct current control signal based upon a compared phase difference therebetween; and
  means for modifying said triangular waveform head position signal in response to said direct current control signal to supply a modified head control signal to said transducer.

9. Apparatus according to claim 8, in which said means connected to modify said head control signal comprises a signal adder.

10. Apparatus according to claim 9, in which an output signal from said exclusive OR gate is fed to a low-pass filter for producing said control signal.

* * * * *

UNITED STATES PATENT AND TRADEMARK OFFICE
CERTIFICATE OF CORRECTION

PATENT NO. : 4,918,546
DATED : April 17, 1990
INVENTOR(S) : Isao Saito

It is certified that error appears in the above-identified patent and that said Letters Patent is hereby corrected as shown below:

On the title page:
In "U.S. Patent Documents" Patent No.

"4,063,387" should be --4,063,287--

IN THE CLAIMS:

Col. 6, line 8, change "mans" to --means--

Signed and Sealed this

Twenty-fourth Day of September, 1991

Attest:

HARRY F. MANBECK, JR.

Attesting Officer

Commissioner of Patents and Trademarks